UNITED STATES PATENT OFFICE.

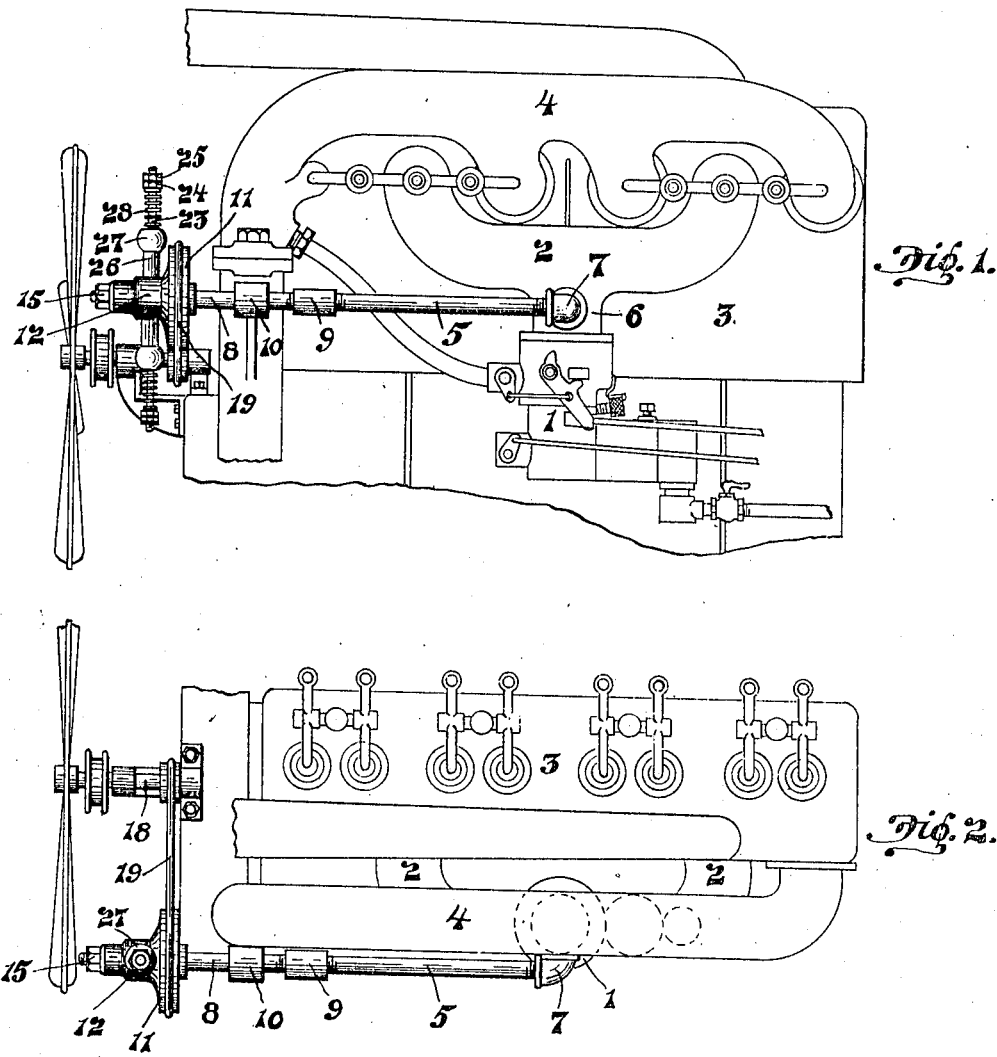

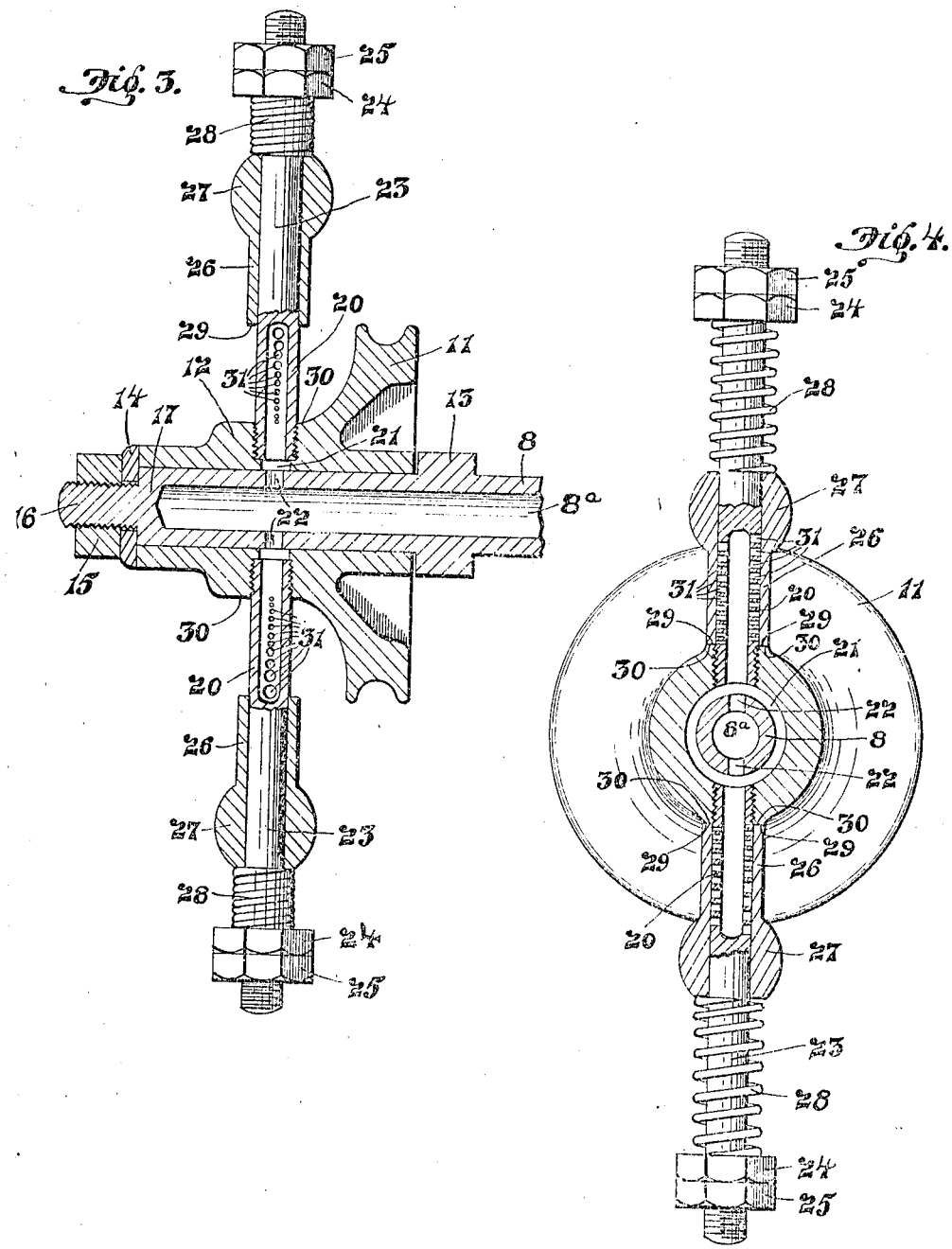

HARRY J. HICK, OF ALLIANCE, OHIO.

GAS-ENGINE.

1,285,998.  Specification of Letters Patent.  Patented Nov. 26, 1918.

Application filed November 23, 1914. Serial No. 873,436.

*To all whom it may concern:*

Be it known that I, HARRY J. HICK, a citizen of the United States, residing at Alliance, in the county of Stark and State of Ohio, have invented certain new and useful Improvements in Gas-Engines, of which the following is a specification.

The invention relates to internal combustion engines receiving fuel in the form of gas or vaporized gasolene combined with air from a carbureter or other source of supply; and the object of the present invention is to provide automatic means for gradually supplying additional air to the engine in proportion to its requirements at varying speeds.

The gas or air which is supplied to an engine from a carbureter is mixed in proper proportions for the requirements of the engine at the starting and during comparatively slow speeds, when the mixture in the combustion chamber is not subject to as high pressure and temperature as prevails during the higher speeds when the engine becomes heated; and accordingly, there is not sufficient air in the mixture to cause complete combustion when the engine is running at the higher speeds and the ignition takes place more frequently and with less duration.

This difficulty is overcome, and additional air is admitted into the engine in exact proportion to its requirements at increasing speeds, by means of one or more inlet tubes having series of graduated inlet ports therein normally closed by a spring-controlled valve sleeve, which is adapted to be shifted by centrifugal force to successively open the apertures in proportion to the increasing speed of the engine.

A convenient embodiment of the invention as applied to an existing type of engine, is illustrated in the accompanying drawings, forming part hereof, in which—

Figure 1 is a fragmentary elevation of an automobile engine, showing the improved air governor applied thereto;

Fig. 2, a plan view of the same;

Fig. 3, a side elevation, partly in section, of the centrifugal air governor, showing the valve sleeves thrown outward to open all the inlet ports; and Fig. 4, an end elevation, partly in section, of the centrifugal air governor, showing the valve sleeves held inward to close all the inlet ports.

Similar numerals refer to similar parts throughout the drawings.

The type of engine employed for illustrating the invention, includes the carbureter 1, the intake manifold 2, the cylinders 3, and the exhaust manifold 4; and for the purpose of the present invention, the air pipe 5 is provided, which preferably leads or opens at one end through the elbow 7, into the inlet 6 of the intake manifold through which the mixture of gas and air is received from the carbureter. The air pipe 5 is connected at the other end with the tubular bearing bar 8, by means of the sleeve coupling 9, which bearing bar is supported by the bracket 10 on one side of the engine.

The governor wheel 11 is rotatably mounted by its hub 12 on the free end of the bearing bar 8, between the collar 13 thereon and the washer 14 retained by the nut 15 on the bolt 16 provided on the closed end 17 of the bearing bar; and as shown, the pulley wheel is geared to the fan shaft 18 of the engine by means of the belt 19, so that the rotation of the pulley wheel is coördinated with the rotation of the engine.

One or more air inlet tubes 20 are radially secured on the hub of the governor wheel, two of these tubes being preferably employed diametrically opposite, as shown, so that one will balance the other; and the inner ends of these tubes communicate with the annular port 21 formed in the hub of the pulley wheel, which port in turn communicates with one or more radial ports 22 provided in the tubular bearing bar 8, thereby communicating with the cavity 8ª thereof and thence through the air pipe 5 into the intake manifold of the engine.

The outer ends of the inlet tubes 20 are preferably extended in the form of the solid stems 23, which have the adjusting nuts 24 and lock nuts 25 on their outer ends; and the intake tubes are provided with slide valves which may be the valve sleeves 26 having the enlarged or weighted outer ends 27, which valve sleeves are normally held inward by action of the coil springs 28, located around the stem between the sleeve and the adjusting nut, so that the inner ends 29 of the valve sleeves will contact with the annular facet 30 formed on the hub of the governor wheel around the inlet tube. These valves are operated outwardly by centrifugal force as the speed of the engine increases, and for this reason may be termed centrifugal valves.

Series of inlet ports 31 are provided along one or more sides of each inlet tube, which ports are preferably graduated in size from a capillary opening at the periphery of the hub, to a much larger opening at the outer end of the tube; and when more than one series of ports is provided on each tube, the openings thereof are staggered with reference to each other, so as to permit of a more gradual admission of additional air into the tube by the operation of the centrifugal valve.

It will be understood that it is desirable, if not absolutely necessary, to gradually introduce and increase the supply of additional air, so as to prevent a sudden inrush of air and a resulting checking or stopping of the engine due to an interference with or an entire exclusion of the suction of fuel from the carbureter or other source of supply; and this is accomplished by the use of slide valves for controlling the graduated inlet ports, as herein described, as distinguished from a disk or other valve in which an opening of substantial area is formed by the initial opening movement of the valve.

The valve sleeve 26 normally covers and closes all the inlet ports, as shown in Fig. 4, and the energy of the spring 28 is so regulated by an adjustment of the nut 24, that the valve sleeve is held in the normal closed position during the starting, and the slow speeds of the engine when additional air is not required. The strength of the spring and the parts of the governor are so proportioned, that when the engine is running at its maximum speed, the valve sleeve will be thrown outward by centrifugal force to uncover and open all the inlet ports of the inlet tube, as shown in Fig. 3; and it is evident that during the intermediate speeds of the engine the valve sleeves will be located in varying positions, thereby uncovering and opening a corresponding number of the graduated ports to admit the amount of additional air which is required for a complete combustion of the gas in the engine.

I claim:

1. An engine, means for supplying a gaseous fuel to the engine, and means for supplying air to the engine including a tubular bar having a radial port therein, a hub geared to the engine journaled on the bar and having an annular port therein registering with the radial port, a radial inlet tube on the hub communicating with the annular port and having an inlet port therein, a valve on the inlet tube normally closing the inlet port and adapted to be thrown centrifugally to open the same.

2. An engine, means for supplying a gaseous fuel to the engine, and means for supplying air to the engine including a tubular bar having a radial port therein, a hub geared to the engine journaled on the bar and having an annular port therein registering with the radial port, a pair of diametrically opposite inlet tubes on the hub communicating with the annular port and having inlet ports therein, and valves on the inlet tubes normally closing the inlet ports and adapted to be thrown centrifugally to open the same.

3. An engine, means for supplying a gaseous fuel to the engine, and means for supplying air to the engine including a tubular bar having a radial port therein, a hub geared to the engine journaled on the bar and having an annular port therein registering with the radial port, a radial inlet tube on the hub communicating with the annular port and having an inlet port therein, a valve on the tube adapted to be thrown centrifugally to open the inlet port, and an adjustable spring normally holding the valve inward to close the inlet port.

HARRY J. HICK.

Witnesses:
LOUISE M. CORBY,
EARL C. CARLSON.